US012683907B2

(12) United States Patent    (10) Patent No.:   US 12,683,907 B2

Beracha et al.      (45) Date of Patent:     Jul. 14, 2026

(54) PROBE PACKET CONGESTION CONTROL

(71) Applicant: MELLANOX TECHNOLOGIES, LTD., Yokneam (IL)

(72) Inventors: Eran Gil Beracha, Tel Aviv (IL); Aviv Kfir, Nili (IL); Liron Mula, Hertzliya (IL); Ilya Vershkov, Rishon LeZion (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 64 days.

(21) Appl. No.: 18/944,428

(22) Filed: Nov. 12, 2024

(65) Prior Publication Data

US 2026/0135819 A1     May 14, 2026

(51) Int. Cl.
| | |
|---|---|
| *G06F 15/173* | (2006.01) |
| *H04L 47/122* | (2022.01) |
| *H04L 47/35* | (2022.01) |
| *H04L 47/62* | (2022.01) |

(52) U.S. Cl.
CPC ........ *H04L 47/6215* (2013.01); *H04L 47/122* (2013.01); *H04L 47/35* (2013.01)

(58) Field of Classification Search
CPC .... H04L 47/6215; H04L 47/122; H04L 47/35
USPC ......................................................... 709/224
See application file for complete search history.

(56) References Cited

U.S. PATENT DOCUMENTS

| | | | | |
|---|---|---|---|---|
| 10,230,605 B1 * | 3/2019 | Filsfils | .................... | H04L 45/34 |
| 11,770,309 B2 * | 9/2023 | Paruchuri | ............... | H04L 43/20 |
| | | | | 370/236 |
| 2015/0188798 A1 * | 7/2015 | Mizrahi | ................. | H04L 45/245 |
| | | | | 370/252 |
| 2022/0407814 A1 * | 12/2022 | Kadosh | .................. | H04L 43/106 |
| 2025/0150376 A1 * | 5/2025 | Camarillo Garvia | ........................ | |
| | | | | H04L 41/082 |
| 2026/0046245 A1 * | 2/2026 | Filsfils | .................. | H04L 45/566 |

\* cited by examiner

*Primary Examiner* — Alan S Chou

(74) *Attorney, Agent, or Firm* — Sheridan Ross P.C.

(57) ABSTRACT

Apparatuses, systems, computing devices, switches, network endpoints, and methods to handle probe packets. In at least one embodiment, probe packets are handled in a more time-efficient manner as compared to non-probe packets by identifying probe packets and directing probe packets to particular queues.

20 Claims, 4 Drawing Sheets

PROBE PACKET CONGESTION CONTROL

TECHNICAL FIELD

At least one embodiment is generally directed toward a hardware processing device and, in particular, toward networking devices and methods of operating the same.

BACKGROUND

Switches and similar network devices represent a core component of many communication, security, and computing networks. Probe packets are sent to switches to collect information relating to performance of the switches. Switches receive and respond to such probe packets after a period of time. The amount of time it takes for a switch to handle such probe packets contributes to the overall performance of the network, meaning that delays in handling probe packets will result in degraded network performance.

SUMMARY

In a network, probe packets are used to gather information about the state and performance of network elements, such as switches and other computing devices. Probe packets may be sent through a network to gather information which may be used to monitor and/or diagnose network health and performance issues of computing devices within the network. Probe packets may be generated by a network management tool executed by a network device. Probe packets may include data such that when a probe packet is received by a computing device, such as a switch, the receiving device may be capable of responding to the probe packet by appending specific data to the probe packet. The specific data appended to the probe packet may be dependent upon a type of information sought by the probe packet.

Such probe packets may be used by congestion control algorithms to gather information on the network state. The information being gathered may be, for example, round trip time, switch congestion, congestion per port, congestion-per-egress queue within an egress port of a switch, and/or other factors. The goal of a probe packet may be to gather the information and return the information to the sender as fast as possible.

A problem that arises in conventional networking devices is that congestion affecting a switch or other computing device in the network may cause a delay in the amount of time it takes for a probe packet to be returned to its sender or other destination. For example, a congested switch may have deep queues which increase the latency of the probe packets. Such issues result in sub-optimal congestion control performance due to non-accurate, outdated information.

The systems and methods described herein reduce the amount of time a probe packet traverses a network by manipulating the way the probe packet is queued within the switches on which the probe packet is gathering information, resulting in improved performance of the network.

Egress ports of a switch or other computing device are mapped to egress queues such that each port is associated with a number of different queues. Each queue associated with a port may correspond to a different quality of service (QoS) value. Each packet received by such a switch or other computing device may be mapped to a particular queue based on a QoS of the packet, resulting in prioritization of some packets over other packets.

The systems and methods described herein control the handling of probe packets such that the probe packets will be enabled to gather information on a congested egress queue while being queued on a priority queue, resulting in lower latencies and smaller queueing time for probe packets.

In accordance with one or more embodiments described herein, a computing device, which may include a switch or multiple switches, is described. According to at least some embodiments, the problem of congestion affecting a switch or other computing device in the network may cause a delay in the amount of time it takes a probe packet to be returned to its sender or other destination. For example, a congested switch may have deep queues which increase the latency of the probe packets. Such issues result in sub-optimal congestion control performance due to non-accurate, outdated information. Embodiments of the present disclosure provided herein describe a solution that is capable of reducing the amount of time a probe packet traverses a network by manipulating the way the probe packet is queued within the switches on which the probe packet is gathering information, resulting in improved performance of the network.

Embodiments of the present disclosure contemplate a solution with multiple components, some of which may be implemented on a switch or other computing device. According to at least some embodiments, a computing device is configured to control the handling of probe packets such that the probe packets will be enabled to gather information on a congested egress queue while being queued on a priority queue, resulting in lower latencies and smaller queueing time for probe packets.

Example aspects of the present disclosure provide a computing system including one or more processing circuits to: determine a packet is a probe packet, wherein the packet comprises a first quality of service (QoS) value; and in response to determining packet is a probe packet: store the first QoS value in memory; write a second QoS value to the packet; direct the packet to a first queue associated with the second QoS value; and store a characteristic of a second queue associated with the first QoS value in the packet.

Aspects include wherein the packet is received from a network location.

Aspects include wherein determining the packet is a probe packet comprises using a lookup machine.

Aspects include wherein the lookup machine comprises ternary content-addressable memory (TCAM) and a database.

Aspects include wherein the second QoS value indicates a high priority QoS.

Aspects include directing the packet to a first queue comprises mapping the second QoS value to the first queue.

Aspects include wherein the first queue is a high priority queue.

Aspects include storing the characteristic of the second queue comprises looking up the characteristic in a database.

Aspects include wherein the database stores characteristics of a plurality of queues.

Aspects include wherein the database refreshes the characteristics of the plurality of queues at particular intervals of time.

Aspects include wherein the characteristic of the second queue is a fill level of the second queue.

Aspects include wherein the one or more processing circuits are further to store an indication of an ingress port and an egress port in the packet.

Aspects include wherein the one or more processing circuits are further to transmit the packet to a destination after storing the characteristic of the second queue.

Aspects include wherein the first QoS value is associated with a first flow, and the second QoS value is associated with a second flow.

Aspects include wherein directing the packet to the first queue associated with the second QoS value comprises identifying the second flow and mapping the second flow to the first queue.

In another illustrative example, a switch is described to include: one or more processing circuits to: determine a packet is a probe packet, wherein the packet comprises a first quality of service (QoS) value; and in response to determining packet is a probe packet: store the first QoS value in memory; write a second QoS value to the packet; direct the packet to a first queue associated with the second QoS value; and store a characteristic of a second queue associated with the first QoS value in the packet.

Aspects include wherein the packet is received from a network location.

Aspects include wherein determining the packet is a probe packet comprises using a lookup machine.

Aspects include wherein the lookup machine comprises ternary content-addressable memory (TCAM) and a database.

In another example, a method is described to include: determining a packet is a probe packet, wherein the packet comprises a first quality of service (QoS) value; and in response to determining packet is a probe packet: storing the first QoS value in memory; writing a second QoS value to the packet; directing the packet to a first queue associated with the second QoS value; and storing a characteristic of a second queue associated with the first QoS value in the packet.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

The present description provides embodiments only, and is not intended to limit the scope, applicability, or configuration of the claims. Rather, the description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

Referring now to FIGS. 1-5, various systems and methods for handling probe packets will be described. The term packet as used herein should be construed to mean any suitable discrete amount of digitized information.

Figure 1:
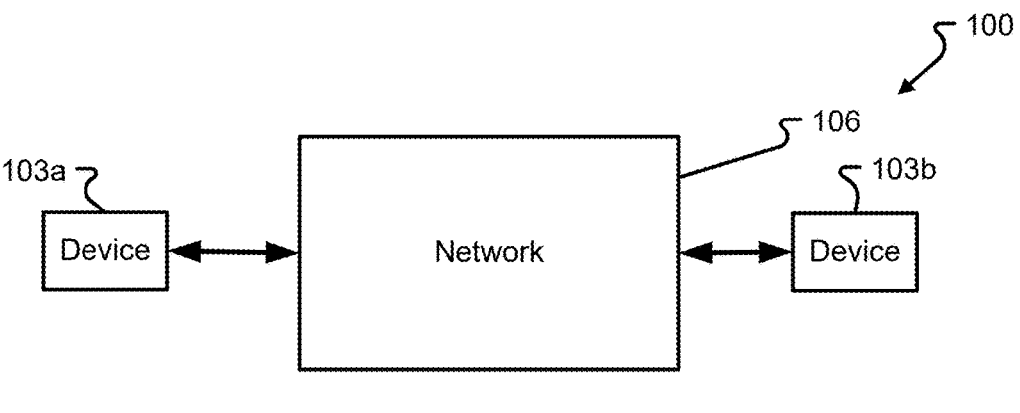
FIG. 1 illustrates a network environment according to at least one embodiment.

FIG. 1 illustrates example components of a system 100 in which devices 103a, 103b communicate via a network 106. Each device 103a, 103b may be a computing device 103 as described below in relation to FIG. 2, such as a switch or another computing device. Each computing device 103a, 103b may include a network interface controller ("NIC"). By way of non-limiting examples, a NIC as described herein may be implemented as a network interface card, a network adapter, a Local Area Network ("LAN") adapter, a physical network interface, a host channel adapter ("HCA"), an Ethernet NIC, and the like.

The first computing device 103a may be connected to the second computing device 103b over a wired and/or wireless connection (e.g., including the network 106). In at least one embodiment, the network 106 may be configured to facilitate the transmission of both data packets and probe packets. Communicate via the network 106 may be based on various communication technologies including Ethernet and may be implemented in any number of wired and/or wireless configurations.

In at least one embodiment, network 106 incorporates a series of routers, switches, and other networking hardware to provide a path of data transmission between the computing devices 103a, 103b. A computing device 103 as described herein may be a computing system or device which may function as a switch or any other type of device capable of receiving and transmitting data via the network 106. A computing device 103 may also or alternatively be a processing device, such as a graphics processing unit (GPU) which may function as a processor and may send and/or receive data either via a network 106 or from other processing devices directly. A computing device 103 may be referred to herein as a switch; however, it should be appreciated that references to a switch may be interpreted as being references to any other type of computing device 103 such as a GPU. While systems and methods described herein are presented in the context of a computing device, it should be understood that the term "computing device" encompasses any device capable of transmitting and/or receiving data. This may include, but is not limited to, desktop computers, laptops, tablets, smartphones, servers, routers (such as wireless, wired, core, edge, or mesh routers), modems (including cable, DSL, fiber optic, or satellite modems), combination modem-router devices, network interface cards (e.g., Ethernet, wireless, fiber, PCIe, or USB NICs), processing circuits, such as GPUs, central processing units (CPUs), application-specific integrated circuits (ASICs), field programmable gate arrays (FPGAs), or other circuitry capable of performing computations, gaming consoles, smart TVs, wearable devices (e.g., smartwatches), network-attached storage (NAS) devices, Internet of Things (IoT) devices (e.g., smart home hubs, sensors, cameras), printers, scanners, point-of-sale (POS) terminals, digital cameras, drones, medical devices, embedded vehicle systems (e.g., infotainment systems), single-board computers, external storage drives, and virtual reality (VR) headsets.

Systems and methods described herein may be used in the context of data centers. Furthermore, while systems and methods described herein are described in terms of computing devices 103, such as switches, which send and receive packets of data via ports, it should be appreciated that the same or similar systems and methods may be utilized by GPUs. Data centers and other computing environments, such as those employing artificial intelligence (AI) training systems, use a network infrastructure, which may be referred to as a fabric, which provides interconnectivity between various components, facilitating rapid data transfer and communication for handling large volumes of data and computationally intensive tasks. Such computing environments may utilize a fabric of processing devices such as GPUs and switches to provide computing capabilities for hosts devices such as personal computers and servers.

The present disclosure describes a system and method for enabling a device, such as a switch, a GPU, or other computing system or device, to address the conventional problem of congestion affecting performance of a processing device which may cause a delay in the amount of time it takes data to be processed by the device. For example, a congested GPU or other processing device may have deep queues which increase the latency of the device. Such issues may result in sub-optimal congestion control performance due to non-accurate, outdated information. Embodiments of the present disclosure provided herein describe a solution that is capable of reducing the amount of time data is processed by a GPU or other processing device by manipulating the way the data is queued within the processing device, resulting in improved performance of the device.

Illustratively, and without limitation, disclosed systems and methods may be used in a computing environment including one or more devices in a data center. For instance, the computing environment may include a plurality of GPUs that communicate with one another via a high-performance high-bandwidth interconnect fabric such as NVIDIA's NVLINK™ as one example. Other systems may provide a single GPU that is connected to NVLINK™.

The NVLINK™ interconnect fabric-which may include communication links, nodes, interconnect management devices, and/or other devices—may provide multiple high-speed links connecting nodes in the form of GPUs. Each node in the computing environment may be connected with at least one other node via one or more high-speed communication links.

The one or more computing devices 103 may be in communication with nodes either directly or indirectly. Such a network of computing devices may be useful in various settings, from data centers and cloud computing infrastructures to AI systems.

As noted above, nodes of a fabric may be computing devices 103, such as personal computers, servers, or other computing devices, and may also include processing devices which may include one or more processing circuits, such as GPUs, CPUs, ASICs, FPGAs, or other circuitry capable of performing computations, as well as memory and storage resources to run software applications, handle data processing, and perform specific tasks as required. Computing devices 103 may be responsible for executing applications and performing data processing tasks. Computing devices 103 as described herein can range from servers in a data center to desktop computers in a network, or to devices such as internet of things (IoT) sensors and smart devices. In some implementations, Computing devices 103 may also or alternatively include hardware such as GPUs for handling intensive tasks for machine learning, artificial intelligence (AI) workloads, or other complex processes.

The use of computing devices 103 to send and receive data via the network 106 may be configured to ensure that data packets are routed with considerations for network congestion, latency, and packet loss, thereby maintaining high reliability and performance standards in communication. Network 106 may employ network protocols that manage data integrity, security, and prioritization, ensuring that sensitive or critical information is transmitted securely and efficiently.

In at least one embodiment, the configuration of network 106 allows for scalability and flexibility in its operations. For example, additional nodes can be integrated into the network without significant reconfiguration of existing infrastructure. Further, network 106 may support various types of data transmissions, including streaming data, bulk data transfer, and real-time communication. Computing devices 103a, 103b, may be configured to communicate via the network 106 as well as with external networks or systems through gateways or similar network interfaces.

Each computing device 103 may operate as or may include a computing unit, such as a personal computer, a server, a GPU, or other computing and/or processing device, and may be responsible for executing applications and performing data processing tasks. Computing devices 103 as described herein may range from servers in a data center to desktop computers in a network, or to devices such as internet of things (IoT) sensors and smart devices, as examples.

Network endpoints communicating via computing devices 103 such as switches may operate as a high-performance computing (HPC) cluster. A cluster of nodes or a network 106 may comprise numerous interconnected computing devices 103 operating as servers, each equipped with CPUs and/or GPUs. The nodes may provide computational horsepower for, as an example, training large-scale artificial intelligence (AI) models or running complex scientific simulations. For AI and machine learning tasks, the computing devices 103 may comprise one or more GPUs or other processing circuitry which may be capable of handling parallel processing requirements of neural networks and other applications.

Computing devices 103 may be or include client devices which, for example, engage in AI-related, research-related, and other processor-intensive tasks, and utilize a network of computing devices 103 and other network nodes to handle the computational loads and data throughput required by such intensive applications. Such computing devices 103 may include, for example, workstations and personal computers used by researchers, data scientists, and professionals for developing, testing, and running AI models and research simulations.

Figure 2:
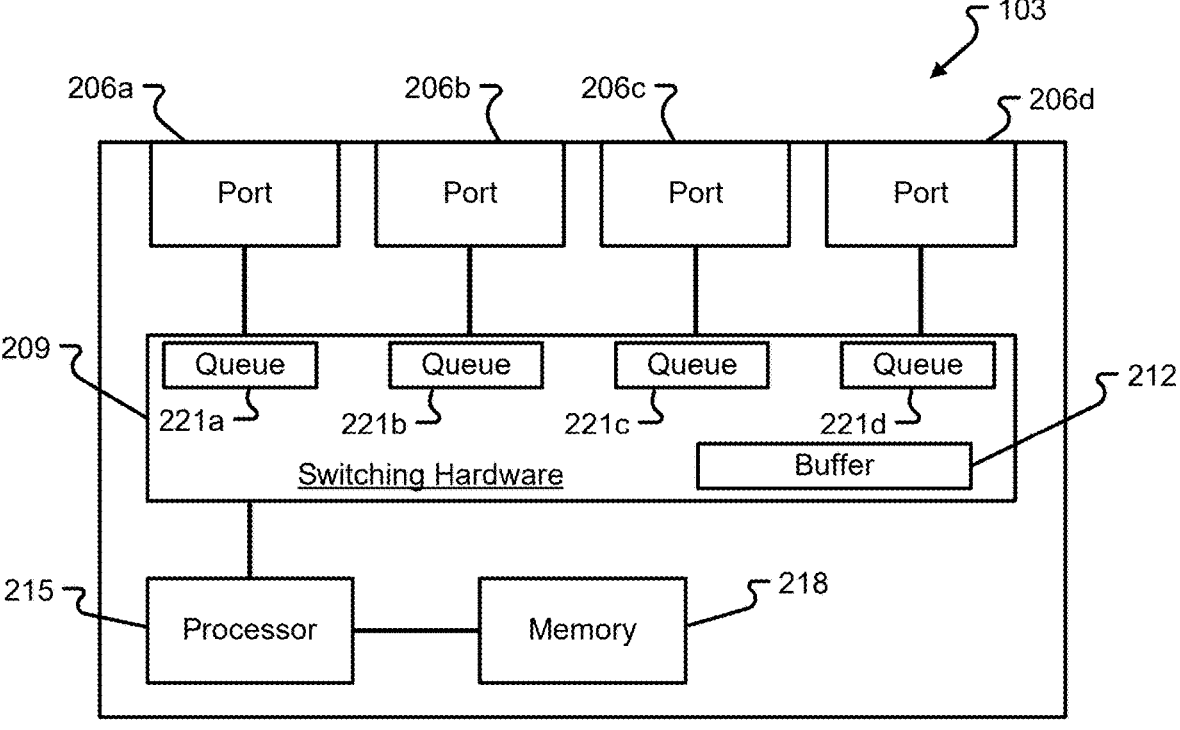
FIG. 2 illustrates a computing device according to at least one embodiment.

As illustrated in FIG. 2, a computing device 103 as referred to herein may be a node, a computing system, a switch, a network interface controller (NIC), a network endpoint, a network device, or any type of device comprising a number of ports 206a-d and capable of receiving and sending data. The ports 206a-d of the computing device 103 may be used to interconnect with other computing devices 103, such as nodes, computing systems, network endpoints, and network devices to form a network. A computing device 103 may act as a central node in a network. Computing devices 103 may be wired in a topology including spine switches, top-of-rack (TOR) switches, end-of-row switches, and/or leaf switches, for example. For example, a computing device 103 may include spine switch and/or a leaf switch and may connect to other computing devices 103. As a non-limiting example, the network 106 may be configured to include a multi-layer switch topology, which may include one or multiple computing devices 103 connecting one or multiple network endpoints. Other non-limiting examples of network topologies that may be utilized in the network 106 include a dragonfly network, a two-level fat tree network, a three-level network, or the like. Such a network of computing devices 103 may provide use cases in various settings, from data centers and cloud computing infrastructures to artificial intelligence systems.

Computing devices 103 may be capable of receiving, processing, and forwarding data, e.g., packets, to appropriate destinations within the network 106, such as other computing devices 103 and/or network endpoints. In some implementations, a computing device 103 may be included in a box, a platform, or a case which may contain one or more computing devices 103 as well as one or more power supply devices and/or other components.

In some implementations, a computing device 103 may comprise one or more ports 206*a-c* connected to one or more ports of other computing devices 103 and/or one or more ports 206 of other network endpoints. Although the computing device 103 of FIG. 2 is illustrated to include four ports 206*a-d*, it should be appreciated that a computing device 103 may include greater or fewer ports than depicted. Processes, such as applications executed by network endpoints may involve transmitting data to other network endpoints of a network 106 via computing devices 103. Data may flow through the network 106 using one or more protocols such as transmission control protocol (TCP), user datagram protocol (UDP), or Internet protocol (IP), for example. Each computing device 103 may, upon receiving data from a network endpoint or another computing device 103, examine the data to identify a destination for the data and route the data through the network. Routing within the computing device 103 may be implemented using a combination of switching hardware 209 and other circuit(s).

The ports 206*a-d* of a computing device 103 may be capable of facilitating the transmission of data packets, or non-packetized data, into, out of, and through the computing device 103. Such ports 206*a-d* may serve as interface points where network cables may be connected, connecting the computing device 103 with other computing devices 103 and/or other nodes.

Each port 206*a-d* may be capable of receiving incoming data packets from other devices and/or transmitting outgoing data packets to other devices. In some implementations, ports 206*a-d* may be configured to operate as either dedicated ingress or egress ports 206 or may be enabled to operate in a dual functionality capable of performing ingress and egress functions. For example, an egress port 206 may be used exclusively for sending data from the computing device 103 and an ingress port 206 may be used solely for receiving incoming data into the computing device 103.

Switching hardware 209 of a computing device 103 may be capable of handling a received packet by determining a port 206 from which to send the packet and forwarding the packet from the determined port 206. Each port 206 of a computing device 103 may be associated with one or more queues 221*a-d*. When a packet, or data in any format, is to be sent from a port 206, the packet may be stored in a queue 221 associated with the port 206 until the port 206 is ready and/or available to send the packet.

The switching hardware 209 and/or other circuit(s) of a computing device 103 may utilize information stored in memory 218 to support routing decisions. The switching hardware 209 may include a number of queues 221*a-d* to support packet flows into and out of the ports 206*a-d*, respectively. In some embodiments, the queues 221*a-d* may correspond to a buffer 212 or the like that can be used to stage or collect packets or parts of packets when received at a port 206*a-d* and/or for transmission by a port 206*a-d*.

In support of the functionality of the switching hardware 209, one or more circuits may be configured to control aspects of the switching hardware 209 to enable adaptive routing in relation to packets. Such circuits may include one or more processors or microprocessors and may in some implementations include a CPU, an ASIC, and/or other processing circuitry which may be capable of handling computations, decision-making, and management functions required for operation of the computing device 103.

Circuits of a computing device 103 may be configured to handle management and control functions of the computing device 103, such as managing routing groups, setting up tables, configuring ports, and otherwise managing operation of the computing device 103. Circuits may execute software and/or firmware to configure and manage the computing device 103, such as an operating system and management tools.

Such a circuit of a computing device 103 may, for example, include a processor 215. A processor 215 of a computing device 103 may include one or more processing circuits, such as graphics processing units (GPUs), central processing units (CPUs), data processing units (DPUs), application-specific integrated circuits (ASICs), field programmable gate arrays (FPGAs), or other circuit(s) capable of performing computations, as well as memory and storage resources to run software applications, handle data processing, and perform specific tasks as required. In some implementations, computing devices 103 may also or alternatively include hardware such as GPUs for handling intensive tasks for machine learning, artificial intelligence (AI) workloads, or other complex processes.

Memory 218 of a computing device 103 as described herein may comprise one or more memory elements capable of storing configuration settings, routing groups, application data, operating system data, and other data. Such memory elements may include, for example, random access memory (RAM), dynamic RAM (DRAM), flash memory, non-volatile RAM (NVRAM), ternary content-addressable memory (TCAM), static RAM (SRAM), and/or memory elements of other formats. Memory elements of the memory 218 may also include one or more registers, such as general-purpose registers, special purpose registers, data registers, and other types of registers which may be used to store and retrieve information relating to fill levels of queues, QoS values of packets, and other information.

As described in further detail herein, memory 218 of a computing device 103 may store information relating to the performance of the computing device 103. As examples, the memory 218 may store information such as data relating to round-trip time of packets received and sent by the computing device 103, congestion of the computing device 103, congestion of one or more ports 206*a-d* of the computing device 103, congestion per queues 221*a-d* of the computing device 103, packet loss of the computing device 103, error rates of the computing device 103, bandwidth utilization of the computing device 103, throughput of the computing device 103, temperature of the computing device 103, power metrics of the computing device 103, and/or other information.

Information stored in the memory 218 of the computing device 103 may be used in relation to responding to probe packets as described in greater detail below by appending data to a probe packet received by the computing device 103 such that the probe packet may be transmitted from the computing device 103 and received by another computing device 103 which may be enabled to access the information to determine or analyze a performance of the computing device 103.

The memory 218 of the computing device 103 may also be used to store data in the form of databases and/or in registers. For example, the memory 218 may comprise a register which may be used to store sampling QoS values as described below. The memory 218 may hold an egress queue mapping database which may be used to map probe packets received by the computing device 103 to priority egress queues. The memory 218 may also hold an egress queue fill level database which may be used to store sampled values of fill levels of egress queues of the computing device 103.

Figure 3:
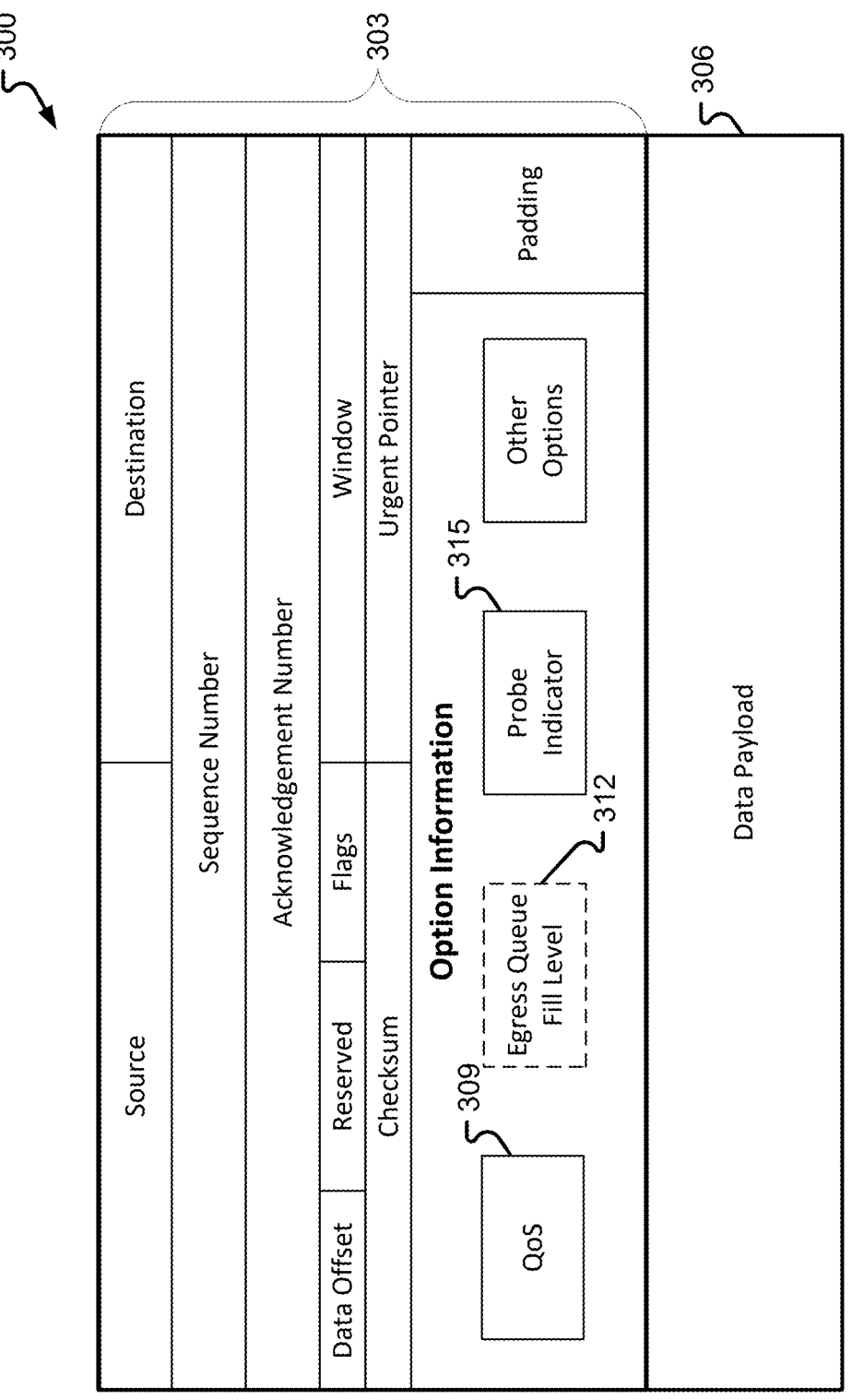
FIG. 3 illustrates a packet according to at least one embodiment.

A packet 300, such as a probe packet, as described herein may refer to a basic unit of data transmitted between computing devices 103 in a data connection. A packet 300 may, for example, be a TCP packet, which may also be known as a TCP segment, and may be sent as part of a TCP connection. A packet 300 may consist of two components: a header 303 and a data payload 306. FIG. 3 illustrates components of a packet 300 in accordance with one or more of the implementations described herein. It should be appreciated that in some embodiments, a packet may comprise more or fewer elements than those illustrated in FIG. 3.

A header 303 of a packet 300 may contain information required for the proper functioning of a protocol. For example, a header 303 of a TCP packet may have a minimum size of 20 bytes and may be up to 60 bytes long, depending on the number and size of optional fields.

The header of the packet may include fields including, but not limited to, an indication of a source port, an indication of a destination, a sequence number, an acknowledgement number, data offset information, reserved bits, one or more flags, a window size, a checksum value, an urgent pointer, option information, and/or padding.

The option information field may be of a variable length and may contain optional information, such as maximum segment size, window scaling, or selective acknowledgments, as well as quality of service (QoS) 309, egress queue fill level 312, a probe indicator field 315, and/or other information.

A QoS 309 may be a number indicating a QoS 309 with which the packet 300 is associated. For example, a QoS 309 of a packet 300 may be considered a descriptor. A packet classifier of a computing device 103 may be configured to parse the header 303 of the packet 300 and identify the QoS 309 of the packet 300. The QoS 309 of the packet 300 may indicate a QoS to be applied to the packet 300, i.e., the level of priority for transmission. The QoS 309 of the packet 300 may be used by the computing device 103 to determine an egress port 206*a-d* through which the packet is to be transmitted and a queue 212*a-d* in which the packet 300 is to be placed while awaiting transmission. For example, upon receiving an incoming packet 300, an ingress port 206 receiving the packet 300 may place the payload 306 of the packet in a buffer 212 in memory 218 and notify decision and queuing logic that the packet 300 is ready for processing. A packet classifier may next parses the header 303 of the packet 300 to read the QoS 309 of the packet 300 and determine an egress port 206 (or ports) through which the packet 300 is to be transmitted and the queue 221 in which the packet 300 is to be placed while awaiting transmission. In some implementations, a computing device 103 may include a dedicated queue 221 for each egress port 206 or multiple queues per egress port, with one queue for each QoS value.

A computing device 103 as described herein may include one or more circuits which function as a lookup machine and a copy machine. When a packet ingresses the computing device 103, a lookup machine comprising a TCAM and a database may be used to match predefined fields of the packet 300, e.g., the QoS 309, to determine whether the packet 300 is a probe packet.

An egress queue fill level 312 may be a number indicating a fill level of an egress queue 221 of a computing device 103. The egress queue fill level 312 may be written to a probe packet 300 by a computing device 103 which receives the probe packet 300. It should be appreciated that egress queue fill level 312 is used as an example. A probe packet 300 may be configured to gather information on any number factors of a computing device 103. For example, a probe packet 300 may be configured to gather information relating to round-trip time of the packet 300, congestion of the computing device 103, congestion of a specific port or ports 206*a-d* of the computing device 103, congestion of a specific queue or queues 221*a-d* of the computing device 103, packet loss of the computing device 103, error rates of the computing device 103, bandwidth utilization of the computing device 103, throughput of the computing device 103, temperature of the computing device 103, power metrics of the computing device 103, and/or other information.

A probe indicator field 315 may be a number stored in the header 303 of a probe packet 300 which may be used by a computing device 103 to determine whether a particular packet 300 is a probe packet 300. As an example, a particular field of a header 303 of a packet 300 may serve as a probe indicator field. A zero in the probe indicator field of a packet 300 may be used by a computing device to determine the packet 300 is not a probe packet, while a one in the probe indicator field of a packet 300 may be used by a computing device to determine the packet 300 is a probe packet. As should be appreciated, there are many ways for a computing device 103 to be configured to determine whether a given packet is a probe packet. The present disclosure should not be considered as being limited to any specific manner of identifying a probe packet.

The data payload 306 of the packet 300 may be data being transmitted between a sender and a receiver. The payload 306 may follow the header 303 and may vary in size, depending on the maximum segment size and the amount of data being transmitted.

Figure 4:
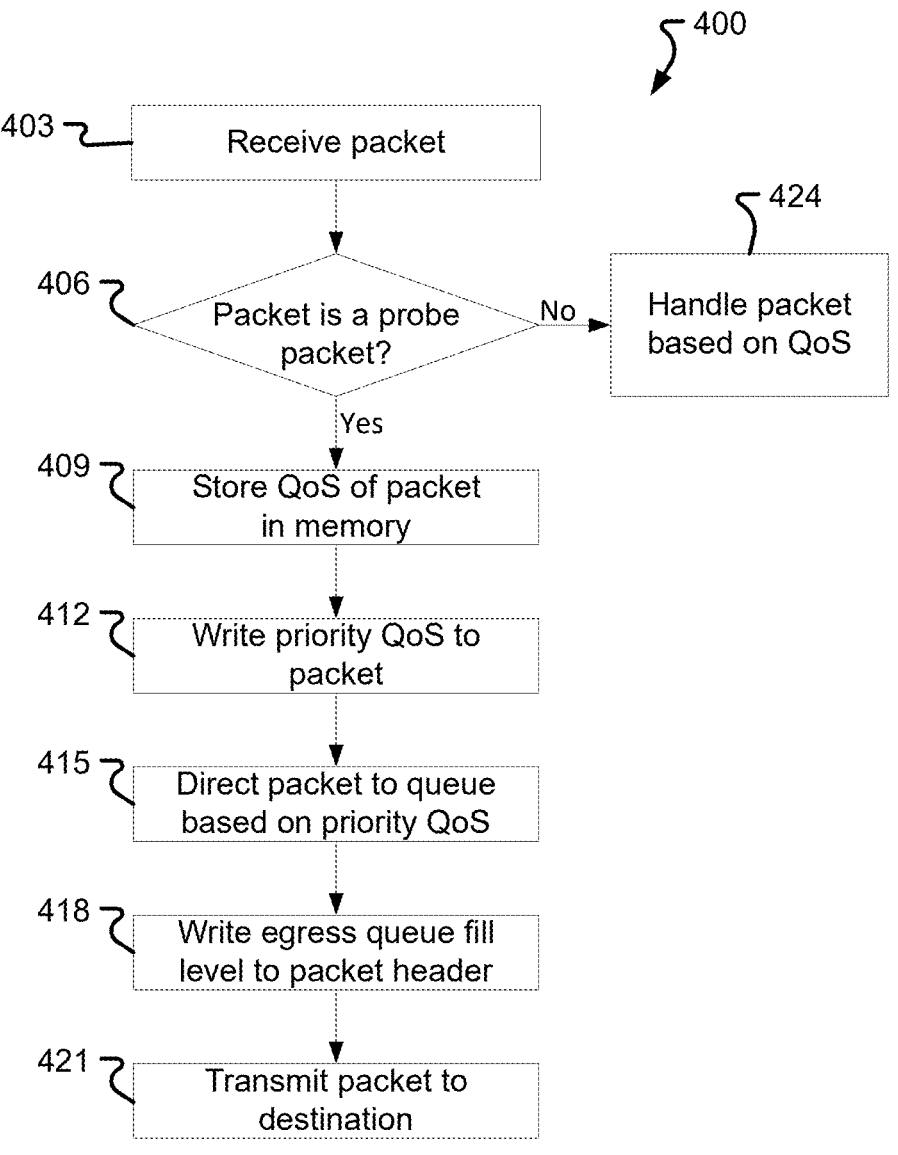
FIG. 4 is a block diagram illustrating a method according to at least one embodiment.
Figure 5:
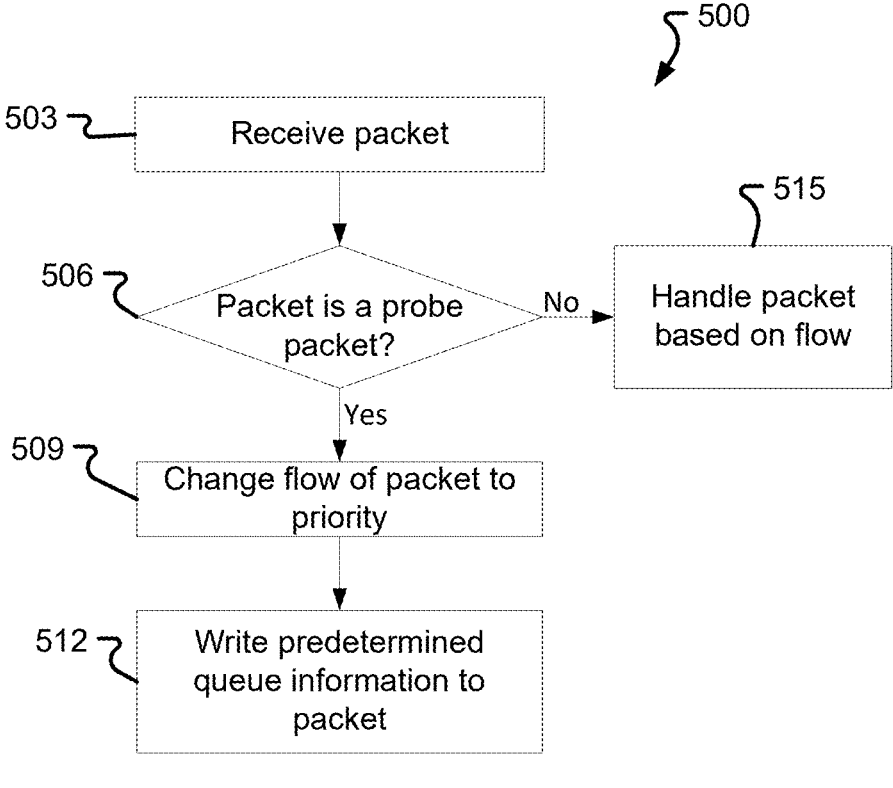
FIG. 5 is a block diagram illustrating a method according to at least one embodiment.

Referring now to FIGS. 4 and 5, additional details and functions of the systems, networks, and devices will be described in accordance with at least some embodiments of the present disclosure. Various methods will be described with reference to particular elements. It should be appreciated that the steps of some methods may be incorporated into other methods and/or the order of steps of some methods may be changed without departing from the scope of the present disclosure. Additionally, while certain steps are described as being performed by one element, it should be appreciated that other elements may be configured to perform similar or identical steps without departing from the scope of the present disclosure.

With reference to FIG. 4, a first method 400 will be described in accordance with at least some embodiments of the present disclosure. Some or all steps of the method 400 may be performed at a computing device 103 using some or all components of a computing device 103 as depicted and described herein.

The method 400 begins with the computing device 103 receiving a packet at 403. The packet may be received by the computing device 103 directly or indirectly from another computing device 103, such as a NIC. The source of the packet may have generated the packet so as to include a specific QoS value. As described above, the QoS value of the packet may be stored in a header of the packet.

If the packet is not a probe packet, the QoS value is a value which may be used by the receiving computing device 103 to associate the packet as belonging to a particular network flow, assign a priority to the packet, or to otherwise handle the packet by placing the packet in a specific queue 221. In this way, data packets, i.e., packets which are not probe packets, will be handled by the same ingress queue 221.

If the packet is a probe packet, the QoS value is a value which indicates a queue of the receiving computing device 103 on which the probe packet is to gather information. Using the method 400, the receiving computing device 103 may not place the probe packet in the queue 221 associated with the QoS value of the probe packet, but instead may direct the probe packet to a high priority, or VIP, queue as described below. By setting the QoS value of the probe packet to the same QoS value as certain data packets, the probe packet will collect data on the ingress queue 221 that handles the data packets.

The receiving computing device 103 may be one of a number of computing devices 103 which receive and transmit the packet. For example, the source computing device may transmit the packet toward a network destination. The network destination may be the same device as the source computing device or may be a different device. Between the source computing device and the network destination, the packet may be handled by a number of intermediate computing devices 103 such as switches. If the packet is a probe packet, each of the intermediate computing devices may be capable of appending data to the probe packet, such that the probe packet gathers information on a series of computing devices 103 in the network.

At 406, after receiving the packet, the computing device 103 may determine whether the packet is a probe packet. In some implementations, determining whether a packet is a probe packet may comprise the computing device using a lookup machine and a copy machine. For example, when a packet ingresses the switch, a lookup machine consisting of a TCAM and a database may be used to match one or more predefined fields in a header of the packet to determine whether the packet is a probe packet. The predefined fields in the header of the packet may for example be a probe indicator field 315 as described above in relation to FIG. 3. It should be appreciated that in some implementations other ways of determining whether a received packet is a probe packet may be used. For example, the computing device may determine whether a packet is of a particular size. If the packet matches the size of a probe packet, the computing device may determine the packet is a probe packet.

If, at 406, the computing device determines the packet is not a probe packet, the method 400 may end at 424 with the computing device handling the packet based on the QoS in the packet.

If, at 406, the computing device 103 determines the packet is a probe packet, the method 400 may comprise reading the QoS field of the packet and storing the QoS field in memory 218 at 409. Storing the QoS field of the packet in memory 218 may comprise copying the QoS field of the packet to a sampling QoS register.

In at least one implementation, a circuit may be configured to extract a predefined field from the header of the received probe packet and subsequently write the extracted field to a designated memory location. The circuit may comprise a packet header analyzing circuit, a data extraction circuit, and a memory interface circuit. The packet header analyzing circuit may be configured to identify and isolate a predefined field within the packet header. The predefined field may include, but should not be considered limited to, a QoS field specified in the packet header or any other field which may be used to identify a queue the probe packet should sample such as a flow identifier field or a destination. Upon identification, the data extraction circuit retrieves the value of the predefined field. The memory interface circuit may next write the extracted field to a memory storage device. The type of memory storage device compatible with the circuit may be, but should not be considered to be limited to, one or more of a TCAM, RAM, SRAM, and NVM.

While the method 400 describes using QoS to determine which queue a probe packet should sample, it should be appreciated that some implementations may not use QoS and may use other means for identifying a queue the probe packet should sample. For example, and as described in greater detail below in relation to FIG. 5, a computing device may be configured to write predetermined queue information to a probe packet without first identifying a particular queue for which the probe packet is configured to sample. That is, the computing device 103 may handle all probe packets similarly.

In some implementations, the computing device 103 may store an indication of an ingress port and an egress port in the probe packet in addition to altering the QoS of the probe packet.

At 412, the computing device may write a priority QoS value to the header of the packet. By writing the priority QoS value to the header of the packet, the computing device 103 changes the original QoS value of the probe packet to a priority QoS value. The priority ingress queue may be solely dedicated to high priority packets, such as probe packets but may be other packets, e.g., management packets. The priority QoS value will cause the probe packet to be placed in an ingress queue that will enable the probe packet to the processed faster than the ingress queue associated with the original QoS value of the probe packet. In some implementations, the original QoS value may be associated with a first flow and the priority QoS value may be associated with a second flow, where the second flow is handled by the computing device 103 with a higher priority, ensuring the probe packet will be handled in a prompt manner.

In some implementations, a circuit may be configured to modify a header of a probe packet by overwriting an existing QoS value in a QoS field of the header with a predefined QoS value. Such a circuit may include a packet header modifier circuit, a predefined QoS value storage circuit, and a header field targeting circuit. The packet header modifier circuit may be configured to access and modify data within the header of a probe packet. As referenced above, it should be considered that in some implementations other fields of the packet header may be used in addition to or instead of a QoS field. The predefined QoS value storage circuit may be configured to hold one or more predefined QoS values to be written into the packet header. The header field targeting circuit may be configured to locate the specific field within the packet header to be overwritten. Upon location of the target field, the packet header modification circuit may execute an overwriting operation, replacing the original QoS value in the QoS field with the appropriate predefined QoS value from the predefined QoS value storage circuit.

In some implementations, a control logic circuit may be configured to manage the timing and execution of the overwrite operation to ensure that it does not disrupt the flow of the probe packet through the network and that the integrity of the data of the probe packet is maintained.

At 415, after writing the priority QoS value to the packet, the computing device 103 may direct the packet to a queue based on the QoS value. The step of directing packets to queues based on the QoS value may be performed for all packets being handled by the computing device 103. As the QoS value of the probe packets has been changed to a priority QoS, the probe packets may be directed to a priority queue while other packets, e.g., data packets, may be directed to the queues associated with the original QoS values of the packets. The queues to which the packets are directed may be ingress queues or egress queues. The probe packets may each be directed to a single priority queue while in other implementations the computing device 103 may include multiple priority queues and may direct different probe packets to different priority queues based on different priority QoS values written to the probe packets.

In some implementations, directing a probe packet to a priority queue may comprise mapping the priority QoS value in the header of the probe packet to a priority queue. In some implementations, the original QoS value of a probe packet may be associated with a first flow, and the priority QoS value written to the probe packet may be associated with a second flow. In such implementations, directing the probe packet to the first queue associated with the second QoS value may involve identifying the second flow and mapping the second flow to the first queue.

At 418, a packet header modifier circuit may be configured to write an egress queue fill level (or another datapoint) of a queue associated with the original QoS value of the probe packet to the header of the probe packet.

In some implementations, a circuit may be configured to associate a probe packet with the original QoS value extracted from the probe packet, identify data in memory associated with a queue associated with the original QoS value extracted from the probe packet, and write the data to the probe packet.

For example, when the computing device 103 stores the original QoS of a probe packet in memory at 409, the computing device 103 may store the original QoS of the probe packet in such a way as to be enabled to match the probe packet with the original QoS of the probe packet once the probe packet has been directed to the priority queue. The original QoS of the probe packet may be used to identify a queue on which the probe packet should be gathering data.

In some implementations, a circuit may include a header analysis and mapping unit designed to parse a header of a probe packet and identify a memory location storing the original QoS of the probe packet. Upon identifying the memory location storing the original QoS of the probe packet, the circuit may perform a memory lookup to query a memory location to access a datapoint associated with a queue associated with the original QoS of the probe packet. The memory location may be structured such as to store data entry for each queue of the computing device. Each data entry may include information relating to the queue, such as a fill level or other data which may be useful to be written to probe packets.

Following the memory lookup, the circuit may integrate the retrieved memory datapoint into the header of the probe packet. The data may overwrite other data in the header may be or appended to the header, effectively updating the packet's content to reflect the data retrieved from memory.

In this way, the computing device may write an egress queue fill level to probe packet headers, the egress queue fill level being associated with a queue to which the probe packet would have been directed if not for the computing device having identified the probe packet as being a probe packet at 406 and changing the QoS of the probe packet to a priority QoS at 412. While egress queue fill level is used as an example throughout the present disclosure, it should be appreciated that other information may alternatively or additionally be written to the probe packets.

By way of the method 400, the computing device 103 may be enabled to check a sampling QoS register to identify an egress queue with which the information to be written to the probe packet should be associated, poll the fill level (and/or other information) of the identified egress queue from a database such as an egress queue fill level database, and write the fill level (and/or other information) to the header of the probe packet.

The database may be a constantly refreshing database that is hardware, firmware, and/or software based. Contents of the database packet may constantly refresh to represent a current or recent egress queue fill level for one or more queues. The contents of the database may be refreshed by the computing device 103 at particular intervals of time.

In some implementations, the database may be hardware based. For example, the computing device 103 may include an ASIC in which wires connect ports and/or queues directly to the database. The database may be constantly filled with new information about congestion on the ports and/or fill levels of queues. In some implementations, the database may be refreshed every cycle or every X number of cycles.

In some implementations, instead of gathering data relating to a particular queue, the computing device 103 may identify a flow associated with each probe packet. Data relating to the flow associated with a probe packet may be written to the probe packet as opposed to or in addition to data relating to an original queue of the probe packet. In some such implementations, the computing device 103 may change the flow of probe packets to one or more priority flows in addition to or instead of changing the QoS of the probe packets.

While the above description relates to writing an egress queue fill level to the header of a probe packet, it should be appreciated that additional or alternative data may be written to the header of a probe packet. For example, a computing device 103 may be enabled to write various network performance metrics to a probe packet including, but not limited to, round trip time, switch congestion, congestion per port, congestion per egress queue, latency, queue depth, rate of queue emptying, and time spent by a packet within a queue. Round trip time may be defined as a duration of a data packet travelling from a source to a destination and back to the source. Switch congestion may be defined as a metric which reflects an increase in packet latency, loss rates, and/or buffer overflows within the computing device 103. Congestion per port may be based on data flow rates, packet loss, and/or delays specific to one or more ports of the computing device 103. Congestion per egress queue may be based on a packet flow rate, queue length, and/or an occurrence of packet drops within a particular egress queue or queues of the computing device 103. Latency may be defined as an amount of time which elapsed from when a packet is sent from its source to when the packet is received at its destination. Queue depth may refer to a number of packets waiting in a particular queue at any given time.

At 421, once the egress queue fill level (and/or other information) is written to the probe packet, the probe packet may be transmitted toward a destination associated with the probe packet.

Referring now to FIG. 5, additional details of a second method 500 will be described in accordance with at least some embodiments of the present disclosure. The method 500 may be performed by a computing device 103 instead of or in addition to the method 400 described above.

The method 500 may begin with a computing device 103 receiving a packet at 503. In the implementation illustrated in FIG. 5, a probe packet may not identify a particular queue or flow on which the probe packet is to gather information. Instead, the computing device 103 may handle each probe packet similarly, by writing predetermined information to each probe packet. The implementation illustrated in FIG. 5 may prove useful when a switch or cluster owner knows which flow queue their data will be queued on. The computing device 103 may be configured to provide probe packets data about one or more specific flow queues as opposed to a flow and/or queue to which a probe packet is specifically directed.

At 506, after receiving a packet, the computing device 103 may determine if the packet is a probe packet. Similar to the method 400 of FIG. 4 as described above, the computing device 103 may determine whether the packet is a probe packet using a lookup machine and a copy machine. For example, when a packet ingresses the switch, a lookup machine consisting of a TCAM and a database may be used to match one or more predefined fields in a header of the packet to determine whether the packet is a probe packet. The predefined fields in the header of the packet may for example be a probe indicator field 315 as described above in relation to FIG. 3. It should be appreciated that in some implementations other ways of determining whether a received packet is a probe packet. may be used. For example, the computing device may determine whether a packet is of a particular size. If the packet matches the size of a probe packet, the computing device may determine the packet is a probe packet.

At 509, if the packet is determined by the computing device 103 to be a probe packet, the computing device 103 may change a flow queue of the probe packet to a priority flow queue. Changing the flow queue of the probe packet to a priority flow queue may enable the probe packet to be handled by the computing device 103 in a more express manner as compared to if the probe packet remained in its original flow queue. Changing the flow queue of the probe packet to a priority flow queue may involve changing a QoS of the probe packet or changing other information in the probe packet. Once the flow queue of the probe packet is changed to a priority flow queue, the probe packet may be stored in a queue associated with the priority flow queue of the probe packet.

Next, at 512, the computing device may write data from a predetermined flow queue to the probe packet. In some implementations, a packet header modifier circuit may be configured to write an egress queue fill level (or another datapoint) of a predetermined flow queue to the header of the probe packet. For example, the computing device 103 may be configured to write an egress queue fill level (or another datapoint) associated with a particular, predetermined flow queue to each probe packet handled by the computing device 103. The computing device 103, in response to receiving and identifying a probe packet, may perform a data lookup to identify a datapoint, such as an egress queue fill level associated with the predetermined flow queue and to write the datapoint to the probe packet. The data may overwrite other data in the header may be or appended to the header, effectively updating the packet's content to reflect the data retrieved from memory.

If, at 506, the packet is determined by the computing device 103 to not be a probe packet, the packet may be handled based on its original flow at 515 as a data packet would normally be handled by the computing device. After either handling the packet based on its original flow queue at 515 or writing the predetermined queue information to the packet at 512, the computing device 103 may forward the packet toward its destination.

In some implementations, the systems and methods described herein, including the method 500 described above, may be utilized in relation to a GPU configured to perform read from and/or write requests to a memory of a remote GPU. A NIC connected to the GPU may be configured to create a packet representing information the GPU is to read from and/or write to the remote GPU. The NIC may send the created packet to a switch configured to perform the systems and methods described herein in such a way as to optimize the time the packet traverses the network and reaches the remote GPU.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," "compute," and variations thereof, as used herein, are used interchangeably, and include any appropriate type of methodology, process, operation, or technique.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

Use of terms "a," "an," "the," and similar referents in context of describing disclosed embodiments (as well as in the context of the following claims) are to be construed to cover both singular and plural, unless otherwise indicated herein or clearly contradicted by context, and not as a definition of a term. The term "and/or" is to be construed as including any and all combinations of one or more of the associated listed items. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into the specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in an illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or the like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example implementations of described techniques, other architectures may be used to implement described functionality and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computing system comprising one or more processing circuits to:
   determine a packet is a probe packet, wherein the packet comprises a first quality of service (QoS) value; and
   in response to determining packet is a probe packet:
   store the first QoS value in memory;
   write a second QoS value to the packet;
   direct the packet to a first queue associated with the second QoS value; and
   store a characteristic of a second queue associated with the first QoS value in the packet.

2. The computing system of claim 1, wherein the packet is received from a network location.

3. The computing system of claim 1, wherein determining the packet is a probe packet comprises using a lookup machine.

4. The computing system of claim 3, wherein the lookup machine comprises ternary content-addressable memory (TCAM) and a database.

5. The computing system of claim 1, wherein the second QoS value indicates a priority QoS.

6. The computing system of claim 1, directing the packet to a first queue comprises mapping the second QoS value to the first queue.

7. The computing system of claim 1, wherein the first queue is a priority queue.

8. The computing system of claim 1, storing the characteristic of the second queue comprises looking up the characteristic in a database.

9. The computing system of claim 8, wherein the database stores characteristics of a plurality of queues.

10. The computing system of claim 9, wherein the database refreshes the characteristics of the plurality of queues at particular intervals of time.

11. The computing system of claim 1, wherein the characteristic of the second queue is a fill level of the second queue.

12. The computing system of claim 1, wherein the one or more processing circuits are further to store an indication of an ingress port and an egress port in the packet.

13. The computing system of claim 1, wherein the one or more processing circuits are further to transmit the packet to a destination after storing the characteristic of the second queue.

14. The computing system of claim 1, wherein the first QoS value is associated with a first flow, and the second QoS value is associated with a second flow.

15. The computing system of claim 14, wherein directing the packet to the first queue associated with the second QoS value comprises identifying the second flow and mapping the second flow to the first queue.

16. A switch comprising one or more processing circuits to:
   determine a packet is a probe packet, wherein the packet comprises a first quality of service (QoS) value; and
   in response to determining packet is a probe packet:
   store the first QoS value in memory;
   write a second QoS value to the packet;
   direct the packet to a first queue associated with the second QoS value; and
   store a characteristic of a second queue associated with the first QoS value in the packet.

17. The switch of claim 16, wherein the packet is received from a network location.

18. The switch of claim 16, wherein determining the packet is a probe packet comprises using a lookup machine.

19. The switch of claim 18, wherein the lookup machine comprises ternary content-addressable memory (TCAM) and a database.

20. A method comprising:
   determining a packet is a probe packet, wherein the packet comprises a first quality of service (QoS) value; and
   in response to determining packet is a probe packet:
   storing the first QoS value in memory;
   writing a second QoS value to the packet;
   directing the packet to a first queue associated with the second QoS value; and
   storing a characteristic of a second queue associated with the first QoS value in the packet.

* * * * *